United States Patent
Golan

(10) Patent No.: US 11,331,983 B1
(45) Date of Patent: May 17, 2022

(54) DYNAMICALLY ACTIVE FRONT WINDSHEILD

(71) Applicant: Snir Golan, Yokneam ILIT (IL)

(72) Inventor: Snir Golan, Yokneam ILIT (IL)

( * ) Notice: Subject to any disclaimer, the term of this patent is extended or adjusted under 35 U.S.C. 154(b) by 0 days.

(21) Appl. No.: 17/646,013

(22) Filed: Dec. 27, 2021

(51) Int. Cl.
*B60J 1/06* (2006.01)
*B60N 2/16* (2006.01)

(52) U.S. Cl.
CPC . *B60J 1/06* (2013.01); *B60N 2/16* (2013.01)

(58) Field of Classification Search
CPC .......................................................... B60J 1/06
USPC ............................................................. 296/89
See application file for complete search history.

(56) References Cited

U.S. PATENT DOCUMENTS

| | | | | |
|---|---|---|---|---|
| 1,634,592 A | * | 7/1927 | Mulligan | B60J 1/04 296/89 |
| 2,082,349 A | * | 6/1937 | Magidson | B60J 1/002 49/63 |
| 2,082,771 A | * | 6/1937 | Howard, Sr. | B60S 1/0411 296/96.14 |
| 3,770,313 A | * | 11/1973 | Jimenez | B60J 11/08 49/118 |
| 2007/0186838 A1 | * | 8/2007 | Mercier | B63B 17/02 114/361 |
| 2007/0186839 A1 | * | 8/2007 | Mercier | B63B 19/00 114/361 |
| 2015/0328964 A1 | * | 11/2015 | Gaudet | B60J 1/06 296/201 |

FOREIGN PATENT DOCUMENTS

| | | | | | |
|---|---|---|---|---|---|
| CN | 109228992 A | * | 1/2019 | | B60N 2/90 |
| EP | 592291 A1 | * | 4/1994 | | B60F 3/003 |
| FR | 2630052 A1 | * | 10/1989 | | |
| GB | 386481 A | * | 1/1933 | | |
| WO | WO-2009044252 A2 | * | 4/2009 | | B63B 17/02 |

* cited by examiner

*Primary Examiner* — Hilary L Gutman
(74) *Attorney, Agent, or Firm* — Haim M Factor—1st-Tech-Ideas.com

(57) ABSTRACT

A dynamic front windshield system in a sports vehicle having a convertible roof, the system directed to improve aerodynamic performance of the sports vehicle while continuing to protect a seated driver from a wind, the system comprising: a central retracting windshield; at least one stationary side front windshield; and a plurality of sensors configured to sense a seating position of the seated driver; wherein the system is configured to lower the central retracting windshield in response to a sensed seating position of the seated driver while driving.

6 Claims, 4 Drawing Sheets

DYNAMICALLY ACTIVE FRONT WINDSHEILD

FIELD OF INVENTION AND BACKGROUND

Embodiments of the current invention relate to automotive performance and energy conservation and specifically to a dynamically active front windshield.

During the history of motorcar development, automobile and vehicle manufacturers have developed aerodynamically improved designs. Such improvements have included shortened leading/front aspects of vehicle for the simple purpose of minimizing excessive wind resistance—which generally serves to slow the vehicle. (In sport/racing vehicles, this design approach has been advanced even further due to performance considerations.) In the claims and specification which follow, the term "wind" is intended to mean the effective air flow towards and against the vehicle as it travels forward on a road surface, as described hereinabove.

A vehicle can be designed to be as aerodynamically efficient as possible while also meeting other standards not required of sport vehicles. Further, aerodynamic drag increases with increasing aerodynamic downforce (as known in the art) and aerodynamic drag can increase fuel consumption of the vehicle. In addition, airflow requirements for at least one system and/or component of a vehicle while travelling at relatively low speeds can outweigh any advantage obtained from aerodynamic downforce.

In many sport vehicles having a retractable/removable roof (hereinbelow referred to as a "convertible roof") the driver may sit in a low position (hereinbelow referred to as a "sport position") or in a high position (hereinbelow referred to as a "regular position"), as known in the art. In any case, even when the driver is sitting in the highest position, a windshield of the vehicle serves to protect the driver from the wind.

Reference is currently made to FIG. 1, which is a pictorial representation of a prior art convertible roof sport vehicle 2 and a front windshield 5. Front windshield 5 serves to protect the driver from the wind during driving; however, the front windshield also acts to impede air flow/wind around sport vehicle 2, detracting from a smooth aerodynamic configuration and vehicle performance.

It would be beneficial to afford an aerodynamic improvement and concomitant performance improvement of the convertible roof sport vehicle by changing the configuration of the front windshield, while continuing to serve to protect the driver, as described hereinabove.

There is therefore a need for a dynamically activated front windshield which can yield improved aerodynamic performance of the convertible sport vehicle while continuing to protect the driver.

SUMMARY OF THE INVENTION

According to one aspect of the present invention, there is provided a dynamic front windshield system in a convertible roof sport vehicle, the system directed to improve aerodynamic performance of the sports vehicle while continuing to protect a seated driver from a wind, the system comprising: a central retracting windshield; at least one stationary side front windshield; and a plurality of sensors configured to sense a seating position of the seated driver; wherein the system is configured to lower the central retracting windshield in response to a sensed seating position of the seated driver while driving. Preferably, wherein the seating position of the seated driver varies between a high position and a low position, the high position being a regular seating position, corresponding to a regular height, and the low position being a sport position, corresponding to a sport height. Most preferably, wherein the system is initially calibrated to the regular height, $H_R$, and the sensors are configured to sense an actual height of the seated driver, $H_A$. Typically, wherein a threshold value $H_T$ is defined in a relationship in which the central retracting windshield is configured to be lowered a displacement, $H_W$, by the system. Most typically, wherein the relationship is: if: $(H_R-H_A)-H_T>0$; then $H_W=(H_R-H_A)-H_T$; else $H_W=0$.

Preferably, wherein the central retracting windshield is configured to be lowered by the system by the displacement, $H_W$ according to values in at least one predetermined lookup table, taking into consideration additional aerodynamic and performance variables. Most preferably, wherein additional aerodynamic and performance variables are related to at least one chosen from the list including: the dynamic front windshield system; the sports vehicle; and the driver. Typically, wherein the at least one stationary side front windshield is a right-side and a left-side stationary front windshield.

According to another aspect of the current invention, there is provided a method of operating a dynamic front windshield system in a convertible roof sport vehicle by a system directed to improve aerodynamic performance of the sports vehicle while continuing to protect a seated driver from a wind, the system comprising: a central retracting windshield; at least one stationary side front windshield; and a plurality of sensors configured to sense a seating position of the seated driver; whereby the system lowers the central retracting windshield in response to a sensed seating position of the seated driver while driving. Most preferably, whereby the seating position of the seated driver varies between a high position and a low position, the high position being a regular seating position, corresponding to a regular height, and the low position being a sport position, corresponding to a sport height. Typically, whereby the system is initially calibrated to the regular height, $H_R$, and the sensors sense an actual height of the seated driver, $H_A$. Most typically, whereby a threshold value $H_T$ is defined in a relationship in which the central retracting windshield is lowered a displacement, $H_W$, by the system. Preferably, where the relationship is: if: $(H_R-H_A)-H_T>0$; then $H_W=(H_R-H_A)-H_T$; else $H_W=0$. Most preferably, whereby the central retracting windshield is lowered by the system by the displacement, $H_W$ according to values in at least one predetermined lookup table, taking into consideration additional aerodynamic and performance variables. Typically, whereby additional aerodynamic and performance variables are related to at least one chosen from the list including: the dynamic front windshield system; the sports vehicle; and the driver. Most typically, whereby the at least one stationary side front windshield is a right-side and a left-side stationary front windshield.

LIST OF DRAWINGS

The invention is described herein, by way of example only, with reference to the accompanying drawings, wherein.

Figure 2:
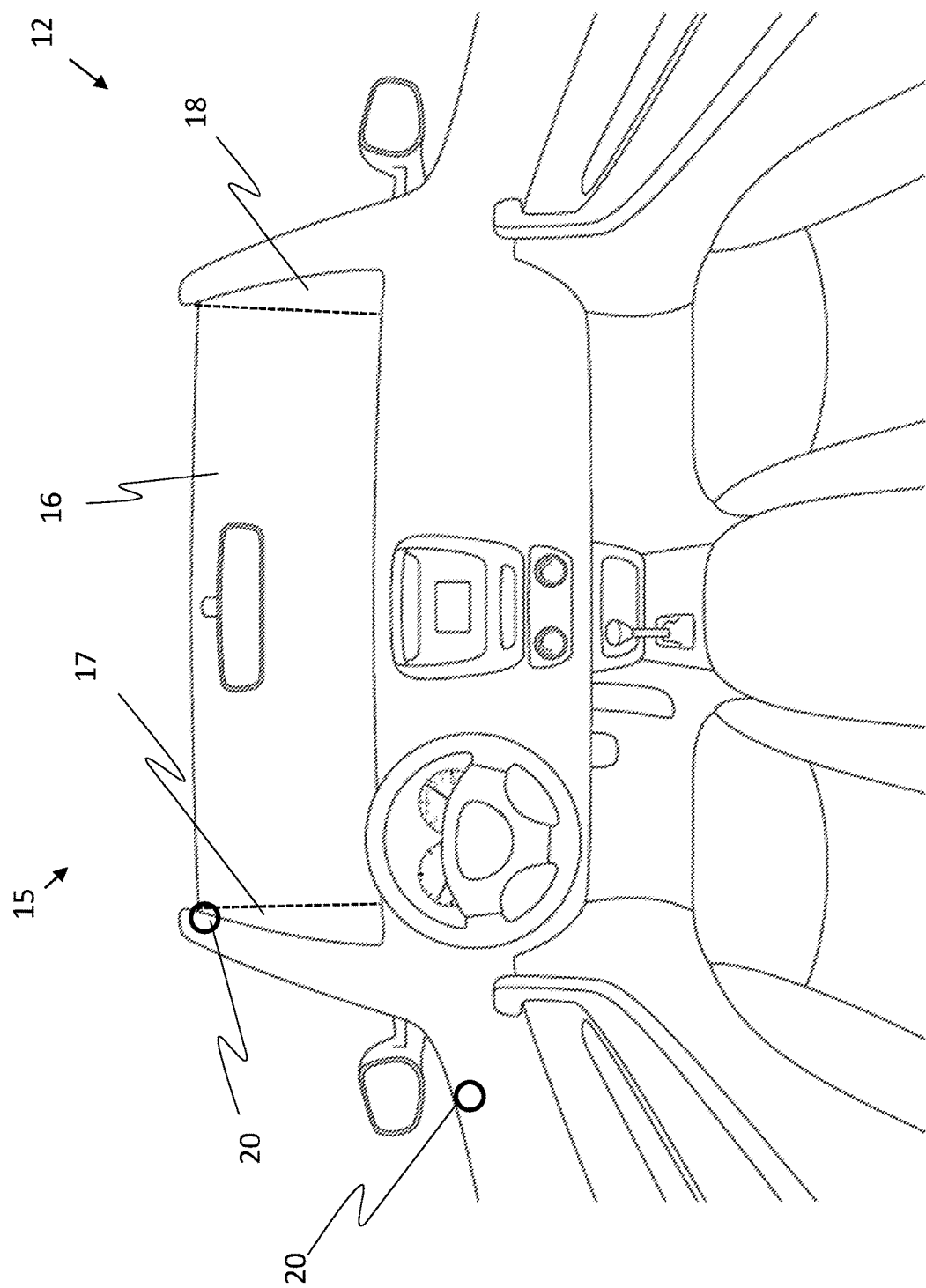
FIG. 2 is a pictorial representation of a convertible roof sport vehicle and a dynamically active front windshield, in accordance with embodiments of the current invention.
Figure 3:
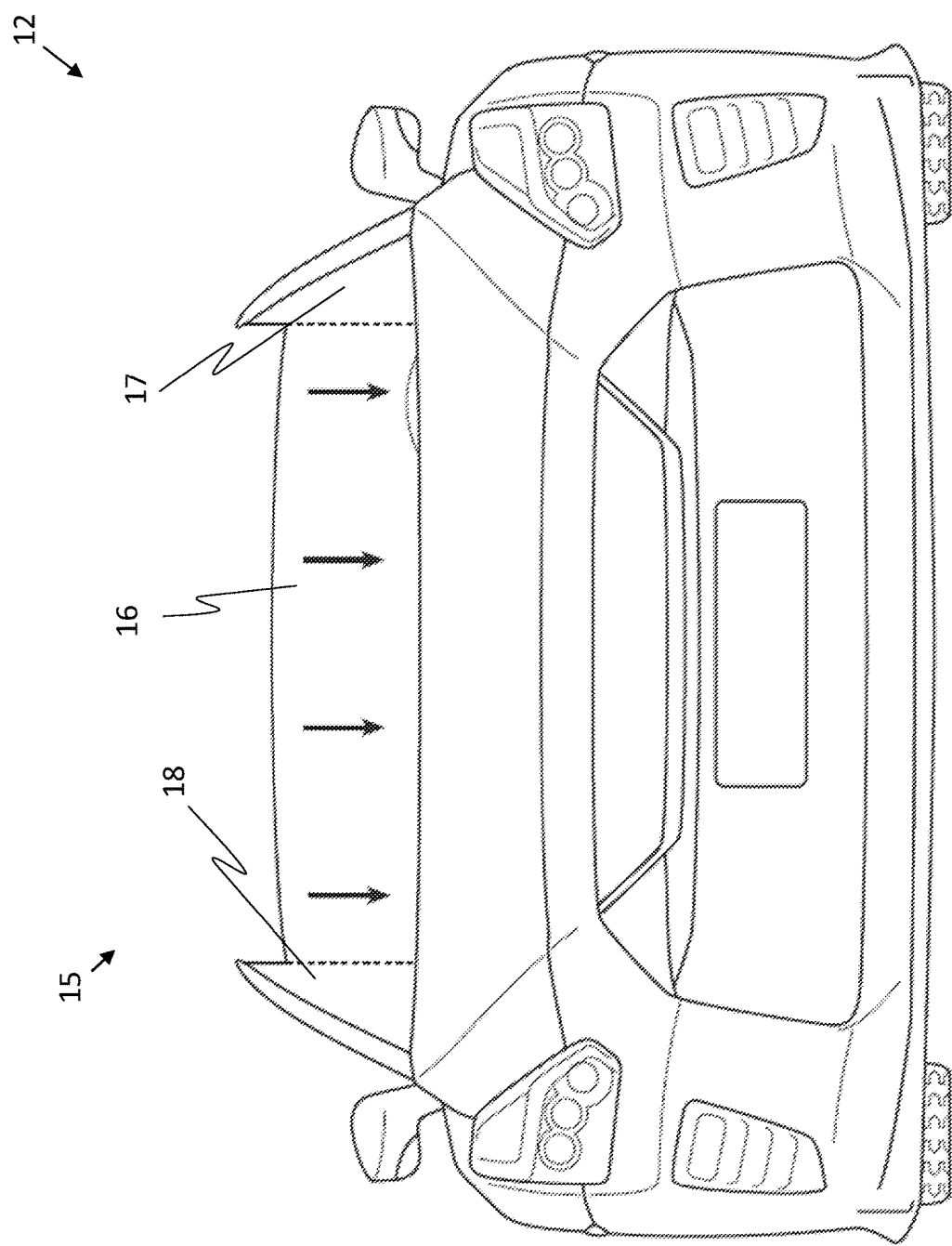
Figure 4:
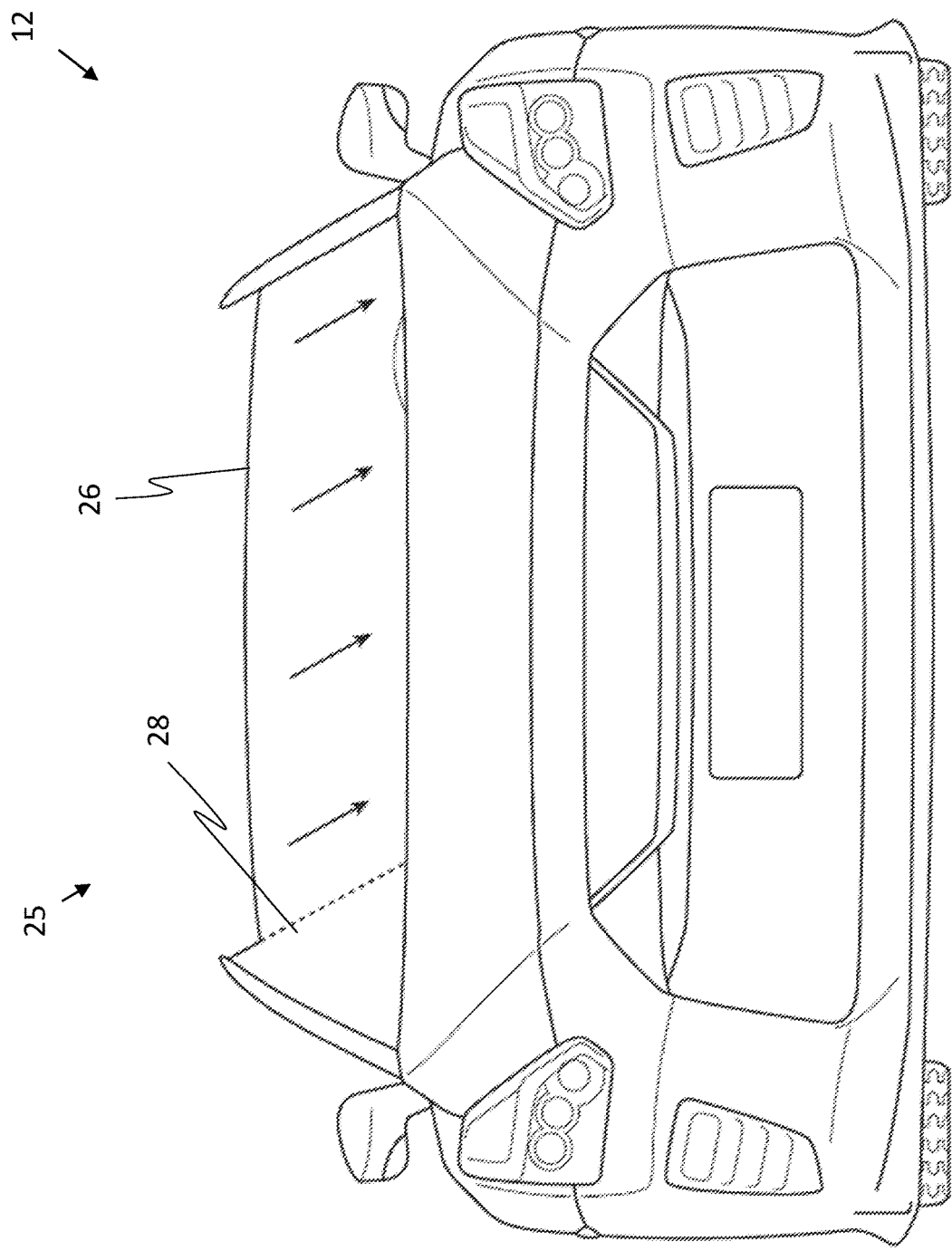

FIG. 3 is a pictorial representation of the convertible roof sport vehicle and the dynamically active front windshield of FIG. 2, viewed facing the sport vehicle, in accordance with embodiments of the current invention; and FIG. 4 is a pictorial representation of the convertible roof sport vehicle and of an alternatively-configured dynamically active front windshield, viewed facing the sport vehicle, in accordance with embodiments of the current invention.

DETAILED DESCRIPTION

Embodiments of the current invention relate to automotive performance and energy conservation and specifically to a dynamically active front windshield.

Figure 1:
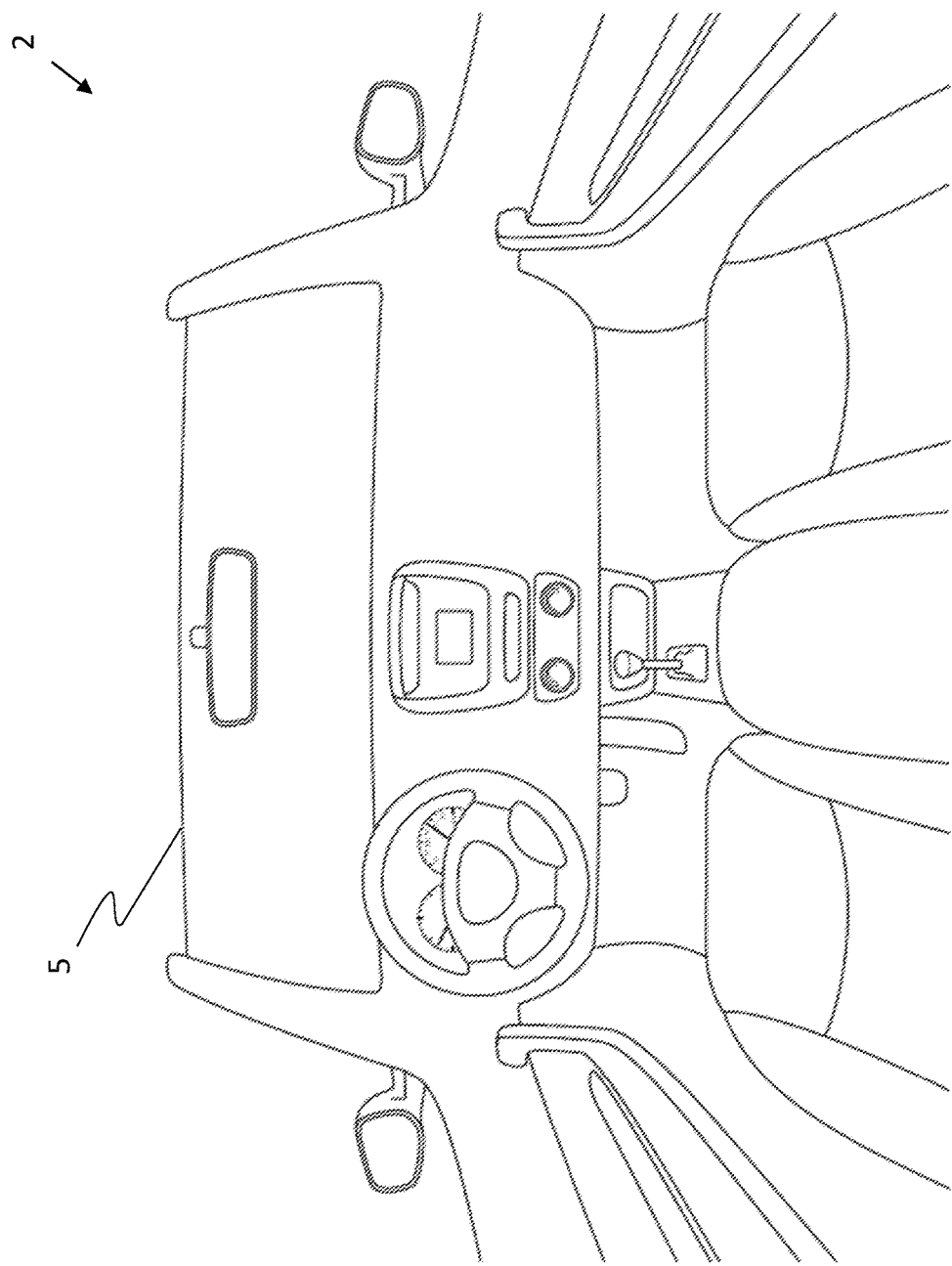
FIG. 1 is a pictorial representation of a prior art convertible roof sport vehicle and a front windshield.

Reference is currently made to FIG. 2, which is a pictorial representation of a convertible roof sport vehicle 12 and a dynamically active front windshield 15, in accordance with embodiments of the current invention. Vehicle 12 and dynamically active front windshield 15 of the current figure are similar in overall configuration to that of vehicle 2 and front windshield 5 shown in FIG. 1, except for the functionality and description hereinbelow. Dynamically active front windshield 15 includes a central retracting windshield 16 and a stationary left-side and a stationary right-side front windshield 17 and 18, respectively. A plurality of exemplary sensors 20 is shown as indicated in the figure (and in other places within the vehicle 12, not shown in the figure) to sense a seating position of the driver—i.e., regular/high position (i.e., a "regular height") versus sport position (i.e., a "sport height"), as noted above and described further hereinbelow.

Reference is additionally currently made to FIG. 3, which is a pictorial representation of convertible roof sport vehicle 12 and dynamically active front windshield 15 of FIG. 2, viewed facing the sport vehicle, in accordance with embodiments of the current invention.

The plurality of exemplary sensors shown in FIG. 2 are connected to a dynamic front windshield system (parts of which are not shown in the figures) which is initially calibrated to a regular/high driver seating position ("regular height") "$H_R$". The sensors are configured to sense an actual height of the seated driver while driving, "$H_A$", where the actual height of the seated driver varies between the regular height and the sport height, as described hereinabove.

Whenever the driver's seating height is sensed to be below a certain threshold value "$H_T$" below the regular height, a determination is made by the system to command the central retracting windshield 16 to be lowered a displacement "$H_W$"—as indicated by the four straight arrows on central retracting windshield 16 of FIG. 3.

The following direct-linear exemplary relationships illustrate one possible mode of operation of the system:

if: $(H_R - H_A) - H_T > 0$, then $H_W = (H_R - H_A) - H_T$ else $H_W = 0$

For purposes of illustration, if a threshold value ($H_T$) is set as 1 cm and if the sensors sense that the driver is sitting 0.5 cm beneath his regular height [($H_R - H_A$)=0.5], then ($H_R - H_A$)−$H_T$<0 (meaning a negative value), and $H_W$=0 (meaning no command is given to lower the central retracting windshield). Alternatively, with a threshold value ($H_T$) set as 1 cm and if the sensors sense that the driver is sitting 3 cm beneath his nominal height [($H_R - H_A$)=3], then ($H_R - H_A$)−$H_T$=2, and a command is given to lower the central retracting windshield 2 cm.

As noted hereinabove, lowering the windshield can yield improved aerodynamic performance of the convertible sport vehicle, while continuing to protect the driver as he sits in the sport position.

Other modes of operation of the system are possible, including non-direct/non-linear relationships (i.e., lowering the windshield a smaller or larger displacement than calculated according to the relationships above) and according to one or more predetermined "lookup table" values, inter alia. Such other modes of operation take into consideration additional aerodynamic and performance variables related to: the dynamic front windshield system; the vehicle; and to the driver, inter alia.

While not shown in the current figure, it is understood that the dynamic front windshield system additionally includes command and control capabilities, and electro-mechanical means, as known in the art, to transform sensor values related to the driver seating position to effectively yield a desired displacement of the dynamically active front windshield, $H_W$.

It is noted that many sports vehicles have a low stance, for aerodynamic performance, inter alia. The height of most sports vehicles varies from 115 to 145 cm. Dynamically lowering the front windshield by about 7.5 cm (approximately 3 inches), in accordance with embodiments of the current invention, can yield a reduction of 5-7% of the overall vehicle height (not taking into consideration side supports of the windshield). The percentage reduction of overall height afforded by lowering the windshield is likely to be similar to a reduction in aerodynamic drag in the sports vehicle.

Reference is additionally currently made to FIG. 4, which is a pictorial representation of a convertible roof sport vehicle 12 and of an alternatively-configured dynamically active front windshield 25, viewed facing the sport vehicle, in accordance with embodiments of the current invention. Apart from the differences noted hereinbelow, alternative configuration of a dynamically active front windshield 25 functions similarly to dynamically active front windshield 15 of FIGS. 2 and 3.

Alternatively-configured dynamically active front windshield 25 includes: a central retracting windshield 26; and a stationary right side windshield 28. As opposed to the dynamically active front windshield of FIGS. 2 and 3, alternatively-configured dynamically active front windshield 25 of FIG. 4 has no stationary left side windshield and central retracting windshield 26 is effectively displaced downward by a diagonal retracting movement, as indicated by the four slanted arrows on the central retracting windshield. Alternatively-configured dynamically active front windshield 25 serves to allow additional surface area of the active front windshield to be retracted, while maintaining only the stationary right-side windshield in position.

Other functionality and components related to the alternatively-configured dynamically active front windshield include: the desired displacement of the dynamically active front windshield, $H_W$; the plurality of exemplary sensors; the dynamic front windshield system; command and control capabilities; and the electro-mechanical means described hereinabove related to the descriptions of FIGS. 2 and 3.

It is noted that FIGS. 1-4 assume a driver position on the left side of the convertible roof sport vehicle, as viewed from inside the vehicle (a typical driver position for North American and European vehicles, inter alia). Embodiments of the current invention are likewise applicable to a driver position on the right of the sport vehicle (such as a driver position for the UK and Japan, inter alia) mutatis mutandis.

It will be appreciated that the above descriptions are intended only to serve as examples, and that many other embodiments are possible within the scope of the present invention and as defined in the appended claims.

The invention claimed is:

1. A dynamic front windshield system in a convertible roof sport vehicle, the system directed to improve aerodynamic performance of the sports vehicle while continuing to protect a seated driver from a wind, the system comprising:
   a central retracting windshield;
   at least one stationary side front windshield; and
   a plurality of sensors configured to sense a seating position of the seated driver;
   wherein the system is configured to lower the central retracting windshield in response to a sensed seating position of the seated driver while driving.

2. The system according to claim 1, wherein the seating position of the seated driver varies between a high position and a low position, the high position being a regular seating position, corresponding to a regular height, and the low position being a sport position, corresponding to a sport height.

3. The system according to claim 2, wherein the system is initially calibrated to the regular height, $H_R$, and the sensors are configured to sense an actual height of the seated driver, $H_A$.

4. The system according to claim 3, wherein a threshold value $H_T$ is defined in a relationship in which the central retracting windshield is configured to be lowered a displacement, $H_W$, by the system.

5. The system according to claim 4, where the relationship is:

$$\text{if: } (H_R - H_A) - H_T > 0; \text{ then } H_W = (H_R - H_A) - H_T; \text{ else } H_W = 0.$$

6. The system according to claim 4, wherein the at least one stationary side front windshield is a right-side and a left-side stationary front windshield.

* * * * *